Sept. 13, 1938.  G. C. PEARCE  2,129,867
REFRIGERATING APPARATUS
Filed Feb. 28, 1935  2 Sheets-Sheet 2

INVENTOR.
BY George C Pearce
Spencer Hardman and Fehr
ATTORNEYS

Patented Sept. 13, 1938

2,129,867

UNITED STATES PATENT OFFICE 2,129,867

REFRIGERATING APPARATUS

George C. Pearce, Dayton, Ohio, assignor to General Motors Corporation, Dayton, Ohio, a corporation of Delaware Application February 28, 1935, Serial No. 8,633

9 Claims. (Cl. 230—24)

This invention relates to refrigerating apparatus and more particularly to control means therefor.

Heretofore in refrigerating systems, individually actuated controls have been provided for controlling the energization of the starting winding and for unloading the compressor during the starting period as well as for opening the motor circuit during a current overload. Recently it has been proposed to unload rotary compressors to permit starting by turning the compressor in the reverse direction a few turns to exhaust the fluid therein in order to facilitate starting in the normal or forward direction. This, however, also required separate actuating means and particularly required the different actuating means always to operate in a predetermined sequence in order to properly prepare the system for starting upon any stopping of the system. All this required separate actuating means for each of these elements, used electric energy, made the sequence of operation rather indefinite, and made the refrigerating system rather expensive.

It is an object of my invention to provide a control means for a refrigerating system having a single actuating means for controlling the starting winding, the unloading of the compressor and the overload device.

It is another object of my invention to provide an improved control means for an electric motor which will insure that the different control devices operate in the proper sequence at all times.

It is a further object of my invention to provide an extremely simple and inexpensive control device for electric refrigerators which will perform all the necessary control functions excepting those of the thermostatic control.

Further objects and advantages of the present invention will be apparent from the following description, reference being had to the accompanying drawings, wherein a preferred form of the present invention is clearly shown.

In the form of my control means herein illustrated, I provide a bimetal actuating means heated by current flowing through the main winding of the compressor motor which controls a plurality of switch means. These switch means are each provided with a toggle snap acting mechanism which are similar but have different differentials and are so located as to cause the switches to open and close in a predetermined sequence. When the heater is cold, the switches are in a position to first start the compressor motor in a reverse direction. After the heater is heated a certain amount, the first set of switches are actuated to reverse the current flow through the starting winding and to cause the motor to start in its normal or forward direction to unload the compressor. After further heat is supplied to the actuating member, the starting winding is opened and the compressor then operates normally during the running period. Should there be an excessive flow of current through the main winding of the motor, the bimetal actuating element will be further heated to open the entire motor circuit to prevent operation of the compressor until the heater cools. At this time, the reverse starting switches are first reset, then the starting winding switch is reset and finally the overload switch is reset. Thus, the switches are reset in the same sequence as they are tripped during the starting period, all of which is performed by the single heater and bimetal actuating element.

Figures 1, 2:
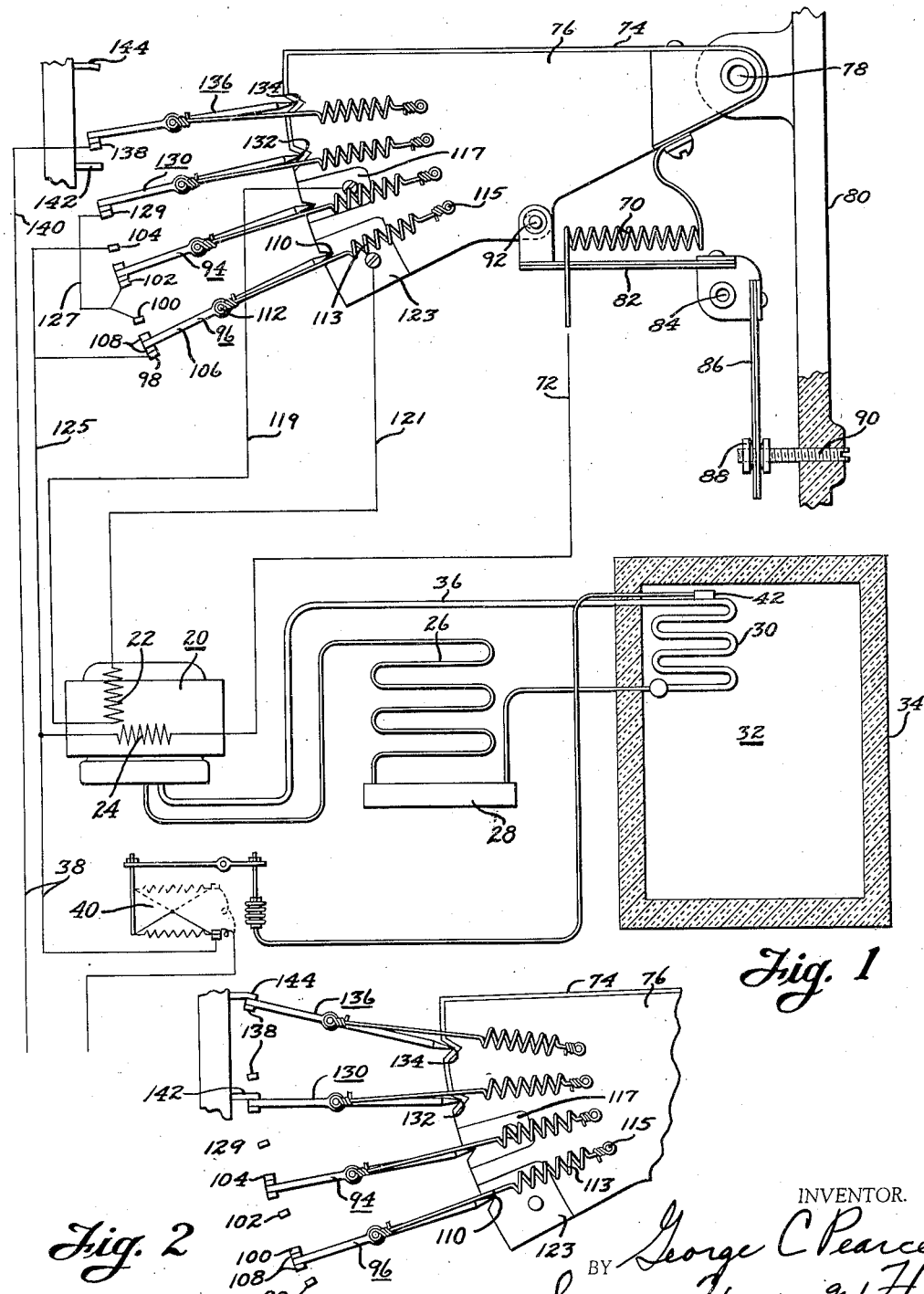
Fig. 1 is a diagrammatic representation of a refrigerating system embodying my improved control means.
Fig. 2 is a fragmentary view of a portion of my control means in a position actuated by an overload current.

Referring to the drawings, and more particularly to Fig. 1, there is shown a motor-compressor unit 20 having a starting winding 22 and a running winding 24. This compressor compresses the refrigerant and forwards the compressed refrigerant to a condenser 26 where the compressed refrigerant is liquefied and collected in a receiver 28. From the receiver 28 the liquid refrigerant is forwarded to an evaporating means 30 located within a compartment 32 containing a medium to be cooled. This compartment 32 is enclosed by insulated walls 34. The liquid refrigerant evaporates under reduced pressure within the evaporating means 30 and is returned to the compressor through the return conduit 36. The compressor 20 is supplied with electric energy through the electric conductors 38 under the control of a snap acting switch means 40 located in series with the electric motor which drives the compressor. This snap acting switch is controlled by a thermostat 42 located in heat exchange with a portion of the evaporating means 30.

Figure 3:
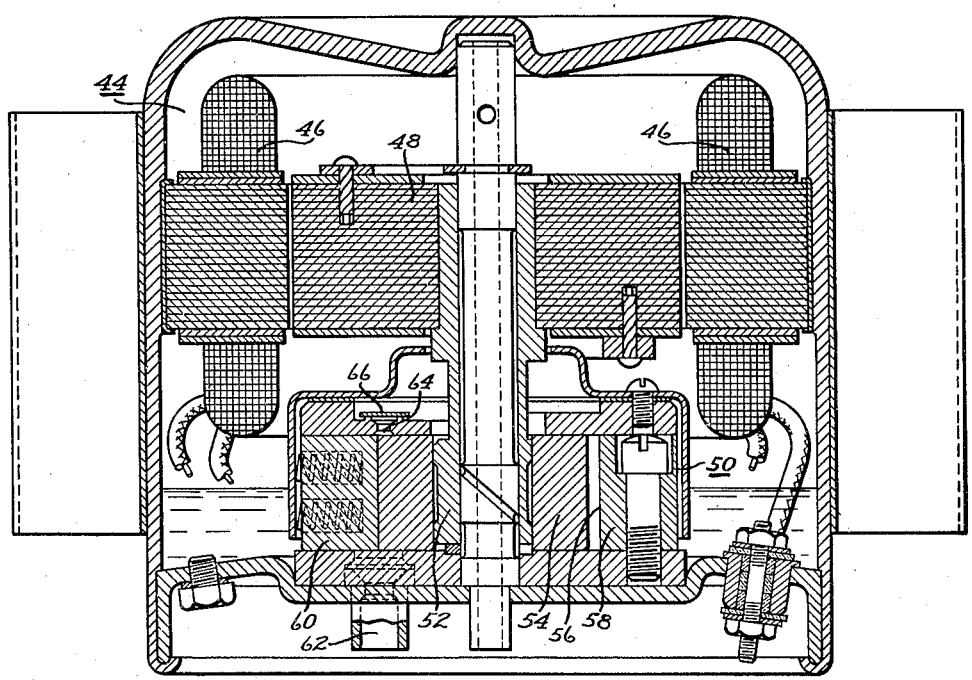
Fig. 3 is a sectional view through the motor-compressor unit of the system shown in Fig. 1.

Referring now more particularly to Fig. 3, which discloses a section of the motor-compressor unit, there is disclosed a sealed unit 44 containing an induction motor having a stator 46 provided with starting and running windings and a rotor 48 which is directly connected to a rotary-compressor 50. The rotary-compressor 50 is provided with an eccentric 52 driven by the motor which is surrounded by a heavy ring 54 which is provided with an oscillating movement by the eccentric 52. The ring oscillates within a chamber 56 which is enclosed by a slotted ring-shaped member 58 provided with a spring pressed divider block 60 which maintains a sealing engagement with the ring member 54. On one side of this divider block is provided a suction inlet 62 and on the opposite side, there is provided an outlet 64 provided with a flapper type of check valve 66. In normal operation, this compressor draws in the gas to be compressed through the suction inlet and discharges it through the outlet protected by the check valve. However, when the compressor is turned in the opposite direction, the gas in the compression chamber is returned to the suction side of the compressor, thereby emptying the compression chamber. Thus, when the compressor is turned in the forward direction following such reverse operation, there is no load for its first revolution so that the starting torque is considerably reduced.

In order to provide a means for first reversing the motor and then starting the motor in the forward direction whenever it is desired to start the compressor, I have provided a multiple switch means actuated by a heater located in series with the running winding of the compressor motor. To this end, I have provided the electric heater 70 which is connected by the electrical conductor 72 to the main winding and connected to an electrical conductor 74 which extends around a portion of the perimeter of an insulated sector member 76 pivoted at 78 to a base member 80. The heater 70 is placed close to a bimetal member 82 to heat and actuate it. This bimetal member 82 is anchored at one end to a pivoted anchor member 84 which has a second bimetal member 86 extending therefrom having its free end held by a grooved nut 88 which is threaded upon a screw 90 extending from the base 80. This bimetal member 86 is responsive to room temperature and serves to compensate the actuating bimetal member 82 for changes in room or environment temperature. The nut 88 may have its position changed in order to adjust the position of the actuating bimetal 82.

The free end of the actuating bimetal 82 is connected by a pin 92 in order to oscillate the sector member 76 which is made of an insulating material. The sector member is provided with two identical toggle snap acting switch mechanisms 94 and 96 for controlling the reversing of the starting winding. The switch 96 cooperates with the contacts 98 and 100 while the switch 94 contacts with the contacts 102 and 104. These switch members 94 and 96 comprise a lever such as the lever 106 provided with contacts 108 upon its upper and lower face and one end and which is pivoted by a knife edge construction at its opposite end to the sector member 76 as shown at 110. At an intermediate point 112, the lever 106 is connected by a tension toggle spring 113 to the sector member 76 at a point designated by the reference character 115. The distance between the sets of contacts 98 and 100 of the switch 96 is the same as the distance between the contacts 102 and 104 of the switch 94. These switches and their contacts are also placed in the same radial alignment with respect to the pivot pin 78 of the segment member so that each will operate at the same time.

The switch 94 is connected through a conductor block 117 mounted in the insulated material of the sector member 76 by an electrical conductor 119 to one end of the starting winding 22, while the opposite end of the starting winding 22 is connected by an electrical conductor 121 to a second conductor block 123 also embedded within the insulation of the sector member 76 and insulated thereby from the conductor block 117. The switch 96 connects with this conductor block 123 and when the switches 96 and 94 are in their lowermost positions as shown in Fig. 1, the electrical conductor 121 is connected through the contact 98 to electrical conductor 125, while the electrical conductor 119 is connected to the contact 102 which in turn is connected through an electrical conductor 127 and a contact 129 to another snap acting switch 130 of a type similar to the switches 94 and 96 but which has a larger differential. This switch 130 which controls the energization of the starting winding is provided with a knife edge received within a notch 132 in the electrical conductor 74 which extends around a portion of the outside of the sector member 76. The conductor 74 is provided with another notch 134 which receives a knife edge of another similar switch member 136 having a larger differential than any of the other switches shown. This switch serves as an overload switch and cooperates with a contact 138 which is connected to the conductor 140 which connects to the other side of the power line.

When current begins to flow through the main winding 24 and the starting winding after the switch 40 has been closed, the compressor and its motor begins to turn in a reverse direction. Soon, however, the current flowing through the heater 70 is sufficient to heat the actuating bimetal 82 to cause it to curl downwardly and to move the sector member 76 in a counter-clockwise direction about its pivot point 78. In a short time both the switch members 94 and 96 reach their tripping points and trip to their opposite positions so that they engage the contacts 100 and 104 respectively. This stops the reverse rotation of the motor and its compressor and starts it to turn in its forward direction, since the conductor 140 is now connected with the conductor 119, instead of the conductor 121. Further operation of the motor causes additional heating of the bimetal actuating member 82 because the current flowing through the main winding 24 continues to move the sector member 76 in a counter-clockwise direction about its pivot point 78. Soon, the switch 130 reaches its tripping position and breaks its contact with the contact 121 to open the starting circuit. The movement of this starting winding switch 130 is limited by the stop member 142, as shown in Fig. 2.

The sector member and the switches 94, 96 and 130 normally assume the positions shown in Fig. 2 during the running period while the overload switch 136 remains in the position shown in Fig. 1. However, should there be any overload in the compressor causing an excessive flow of electric current through the main winding of the motor, the bimetal actuating member will be further heated causing the sector member 76 to move further in a clockwise direction and trip the overload switch 136 to open circuit position to disengage it from its contact 138 and to disconnect the apparatus from the electrical conductor 140. The movement of and the differential of this switch 136 is determined by the stop 144. This switch 136 is provided with the greatest differential by reason of the wider spacing of the contact 138 and the stop 144 so that this switch 136 will be the last to open and the last to close.

When all of the switches have been tripped, the various switch mechanisms assume the position shown in Fig. 2. Inasmuch as the electric circuit connecting with the source of electric energy has been broken, no current flows through the heater 70 or any portion of the apparatus. The bimetal actuating element 82 therefore cools and begins to return the sector member 76 to the position shown in Fig. 1. Inasmuch as the switches 94 and 96 have the smallest differential they will be the first to snap to the position shown in Fig. 1 when the sector member 76 begins to turn in the clockwise direction. This causes the switches to be set for reverse rotation of the motor. Upon further clockwise movement of the sector member 76, the starting winding switch 130 will be tripped. Therefore, when the bimetal actuating element 82 cools a greater amount, the tripping of the overload switch 136 will energize the entire electrical circuit and will cause the motor to start in a reverse direction.

Thus, the switches 94 and 96 always trip first simultaneously, after which they are followed by the starting winding switch 130 and then the overload switch 136 in order, regardless of whether the bimetal actuating element 82 is being heated or cooled. If desired, instead of providing the two switches 94 and 96 for controlling the reversing of the starting winding energization, a single switch with double contacts may be substituted. In normal operation, except for abnormal overloads, the overload switch 136 is not tripped after the switches 94, 96 and 130 are tripped in order to begin the normal running period, and after the thermostatically controlled snap acting switch 40 has opened, the bimetal 82 cools and first resets the switches 94 and 96 and then resets the starting winding switch 130.

Thus, the reverse starting of the motor is always insured. While the heater 70 is shown in series with only the starting winding, it obviously could be placed in series with both the starting and running windings by connecting it in series with the conductor 140 or directly in series with the snap acting switch 40. The system is always protected because should there be any difficulty in starting, the heater 70 will supply sufficient heat to cause the bimetal actuating element 82 to open the overload switch 136 before any damage results.

While the form of embodiment of the invention as herein disclosed constitutes a preferred form, it is to be understood that other forms might be adopted, all coming within the scope of the claims which follow.

What is claimed is as follows:

1. A control system for an electric motor comprising a movable actuating element energized by electric energy flowing through said electric motor, means operated by said actuating element when moved to one position for energizing said motor for rotation in one direction, means operated by said actuating element when moved a predetermined distance from said one position for energizing said motor for rotation in the opposite direction, and means operated by said actuating element when moved a different predetermined distance from said one position for deenergizing the electric motor.

2. A control system for an electric motor comprising a temperature responsive actuating element, means operated by said actuating element when moved to one position for energizing said motor for rotation in one direction, means operated by said actuating element when moved a predetermined distance from said one position for energizing said motor for rotation in the opposite direction, and means operated by said actuating element when moved a different predetermined distance from said one position for deenergizing the electric motor.

3. A control system for an electric motor having starting and running windings comprising a movable actuating element energized by electric energy flowing through said motor, means operated by said actuating element when moved to one position for energizing said windings for rotation of the motor in one direction, means operated by said actuating element when moved to a different position for energizing said windings for rotation in the opposite direction, and means operated by said actuating element when moved to another different position for deenergizing the starting winding.

4. A control system for an electric motor having starting and running windings comprising a temperature responsive actuating element, means operated by said actuating element when moved to one position for energizing said windings for rotation of the motor in one direction, means operated by said actuating element when moved to a different position for energizing said windings for rotation in the opposite direction, and means operated by said actuating element when moved to another different position for deenergizing the starting winding.

5. A control system for an electric motor having starting and running windings comprising a movable actuating element energized by electric energy flowing through said motor, means operated by said actuating element when moved to one position for energizing said windings for rotation of the motor in one direction, means operated by said actuating element when moved to a different position for energizing said windings for rotation in the opposite direction, means operated by said actuating element when moved to another different position for deenergizing the starting winding, and means operated by said actuating element when moved to a fourth position for completely deenergizing the motor.

6. An electric motor-compressor unit, a movable actuating element energized by electric energy flowing through the electric motor, means operated by said actuating element when moved to one position for unloading the compressor, means operated by said actuating element when moved to a second position for operating the motor-compressor unit in a loaded condition, and means operated by said actuating element when moved to a third position for completely deenergizing the electric motor.

7. An electric motor-compressor unit, a temperature responsive actuating element, means operated by said actuating element when moved to one position for unloading the compressor, means operated by said actuating element when moved to a second position for operating the motor-compressor unit in a loaded condition, and means operated by said actuating element when moved to a third position for completely deenergizing the electric motor.

8. A control system for an electric motor having starting and running windings, a source of electric energy, a first switch means for controlling the conduction of electric energy between both of said windings and said source, a second switch means for disconnecting the starting winding from said source without disconnecting the running winding from said source, a third switch means having a forward position and a reversing position for connecting the starting winding in two different ways to said source to cause rotation of said electric motor in either direction, and means for operating said switch means in the following sequence including moving said third switch means to reversing position, closing the second switch means, closing the first switch means, moving the third switch means to forward position, and opening the second switch means.

9. A control system for an electric motor having starting and running windings, a source of electric energy, a first switch means for disconnecting the starting winding from said source without disconnecting the running winding from said source, a second switch means having a forward position and a reversing position for connecting the starting winding in two different ways to said source to cause rotation of said electric motor in either direction, and means for operating said switch means in the following sequence including moving said second switch means to reversing position, closing the first switch means, moving the second switch means to forward position, and opening the second switch means.

GEORGE C. PEARCE.